United States Patent [19]

Biermann

[11] Patent Number: 4,546,620
[45] Date of Patent: Oct. 15, 1985

[54] ABSORPTION MACHINE WITH DESORBER-RESORBER

[75] Inventor: Wendell J. Biermann, Fayetteville, N.Y.

[73] Assignee: The United States of America as represented by the United States Department of Energy, Washington, D.C.

[21] Appl. No.: 668,459

[22] Filed: Nov. 5, 1984

[51] Int. Cl.$^4$ .............................................. F25B 15/00
[52] U.S. Cl. ........................................................ 62/476
[58] Field of Search ........................................... 62/476

[56] References Cited

U.S. PATENT DOCUMENTS

| 3,817,050 | 6/1974 | Alexander et al. | 62/476 X |
| 4,028,078 | 6/1977 | Peckham | 62/476 X |
| 4,439,999 | 4/1984 | Mori et al. | 62/476 x |
| 4,458,500 | 7/1984 | Grossman et al. | 62/476 X |
| 4,475,361 | 10/1984 | Alefeld | 62/476 |

Primary Examiner—Lloyd L. King
Attorney, Agent, or Firm—Robert H. Kelly

[57] ABSTRACT

An absorption refrigeration system utilizing a low temperature desorber and intermediate temperature resorber. The system operates at three temperatures and three pressures to increase the efficiency of the system and is capable of utilizing a lower generator temperature than previously used.

3 Claims, 2 Drawing Figures

# ABSORPTION MACHINE WITH DESORBER-RESORBER

STATEMENT AS TO RIGHTS TO INVENTIONS MADE UNDER FEDERALLY SPONSORED RESEARCH AND DEVELOPMENT

The U.S. Government has rights in this invention pursuant to contract No. W-7405-ENG-26 awarded by the U.S. Department of Energy.

BACKGROUND OF THE INVENTION

This invention relates to an absorption machine and, more particularly, to an improved absorption heat pump/refrigeration machine utilizing a desorber loop and a resorber loop to increase efficiency.

In a typical single effect system, water is generally the refrigerant and lithium bromide is generally the absorbent, and together they are called a solution pair. Some systems employ high temperature solution pairs that are capable of operating at higher generator temperatures to increase efficiency but are precluded from operating at lower evaporator temperatures due to the possibility of freezing and crystallization of the refrigerant, while other chemical systems capable of operating at lower evaporator temperatures, even temperatures below the freezing point of water, could not operate at the higher generator temperatures, which are a consequence of the lower evaporator temperature, without stability problems. Consequently, a single effect system is generally limited in the selection of higher and lower operating temperatures in the generator and evaporator.

Absorption cycles of a single effect type generally comprise a generator for heating a weak or relatively dilute absorbent solution to generate vapor of refrigerant, a condenser for condensing the vapor of refrigerant, an evaporator for evaporating the condensed refrigerant to provide cooling, and an absorber for absorbing the refrigerant vapor from the evaporator into a strong or relatively concentrated absorbent solution. However, the thermal efficiency (coefficient of performance of COP) of a single effect type absorption system is relatively low and ordinarily about 0.6-0.8. Accordingly, with a view toward increasing the thermal efficiency of absorption cycles, two stage generator type absorption units have been developed in which a further generator is additionally provided in the single effect type absorption refrigerator such that the high temperature vapor of refrigerant generated in a first generator is utilized to heat a second generator. In general, a two stage generator type absorption unit comprises a high temperature generator, a low temperature generator, a condenser, an evaporator, an absorber, a high temperature heat exchanger and a low temperature heat exchanger. In the high temperature generator, a refrigerant dissolved in a solution, such as an aqueous solution of lithium bromide, is heated by heating means to discharge the dissolved refrigerant as vapor. Further, in one configuration, the discharged refrigerant vapor is fed through a bundle of heat transfer tubes to the low temperature generator to heat the weak solution supplied from the absorber, and while the refrigerant in the weak solution is discharged therefrom as vapor the vapor from the strong solution is cooled by the latent heat of evaporation nearly all is and condensed prior to entering the condenser. The refrigerant vapor produced in the low temperature generator is supplied to the condenser and cooled by cooling means thereof and then condensed. This condensed refrigerant is generally sprayed into the evaporator, thereby cooling the fluid means which cools a load. Moreover, the solution concentrated by discharging the refrigerant vapor in the high temperature generator is fed to the high temperature heat exchanger in heat exchange relationship with the low temperature weak solution supplied from the low temperature generator, thereby suitably lowering its temperature, and then fed to the low temperature heat exchanger in heat exchange relationship with the weak solution derived from the absorber. Then the solution flows to the absorber which is cooled by cooling means. Thus, solution sprayed into the absorber absorbs the refrigerant vapor supplied from the evaporator, and provides a weak solution. This solution is further directed to the low temperature heat exchanger as described above.

In this manner, the two stage generator type absorption is arranged such that the external heat supplied is utilized twice, once in the high and once in the low temperature generator, thus the thermal efficiency typically increases up to 50/60% in comparison with the single effect type system.

SUMMARY OF THE INVENTION

The invention is directed to an improved single effect desorber-resorber absorption heat pump/refrigeration cycle which utilizes a single effect generator cycle with the addition of a low temperature desorber and an intermediate temperature resorber. The loop operates at three temperatures or temperature spans within a temperature range and three pressures or pressure spans within a pressure range.

In a preferred embodiment, the strong solution from the high temperature generator which is fired from an external source such as direct gas-fired or steam, flows through a high temperature heat exchanger to an intermediate temperature resorber or absorber. The refrigerant vapor from the generator flows through a condenser, where it is condensed, to the low temperature evaporator, where it is vaporized, and then to the intermediate pressure absorber. The weak solution from the intermediate pressure absorber flows through a heat exchanger to the low temperature desorber, which functions like a generator. The vapor driven off from the weak solution in the desorber is reabsorbed in the strong solution derived from the generator. The strong solution from the desorber is pumped back to the absorber and the weak solution from the resorber is pumped back to the generator. Thus, the system contains two strong solutions, two weak solutions, and two solution loops.

Accordingly, it is an object of the present invention to provide an absorption heat pump/refrigeration system that is capable of operating at evaporator temperatures well below the freezing point of water with both heating and cooling efficiencies advanced beyond current commercial offerings.

It is a further object of the present invention to provide an absorption heat pump/refrigeration system that is capable of operating at generator temperatures lower than current commercial offerings.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
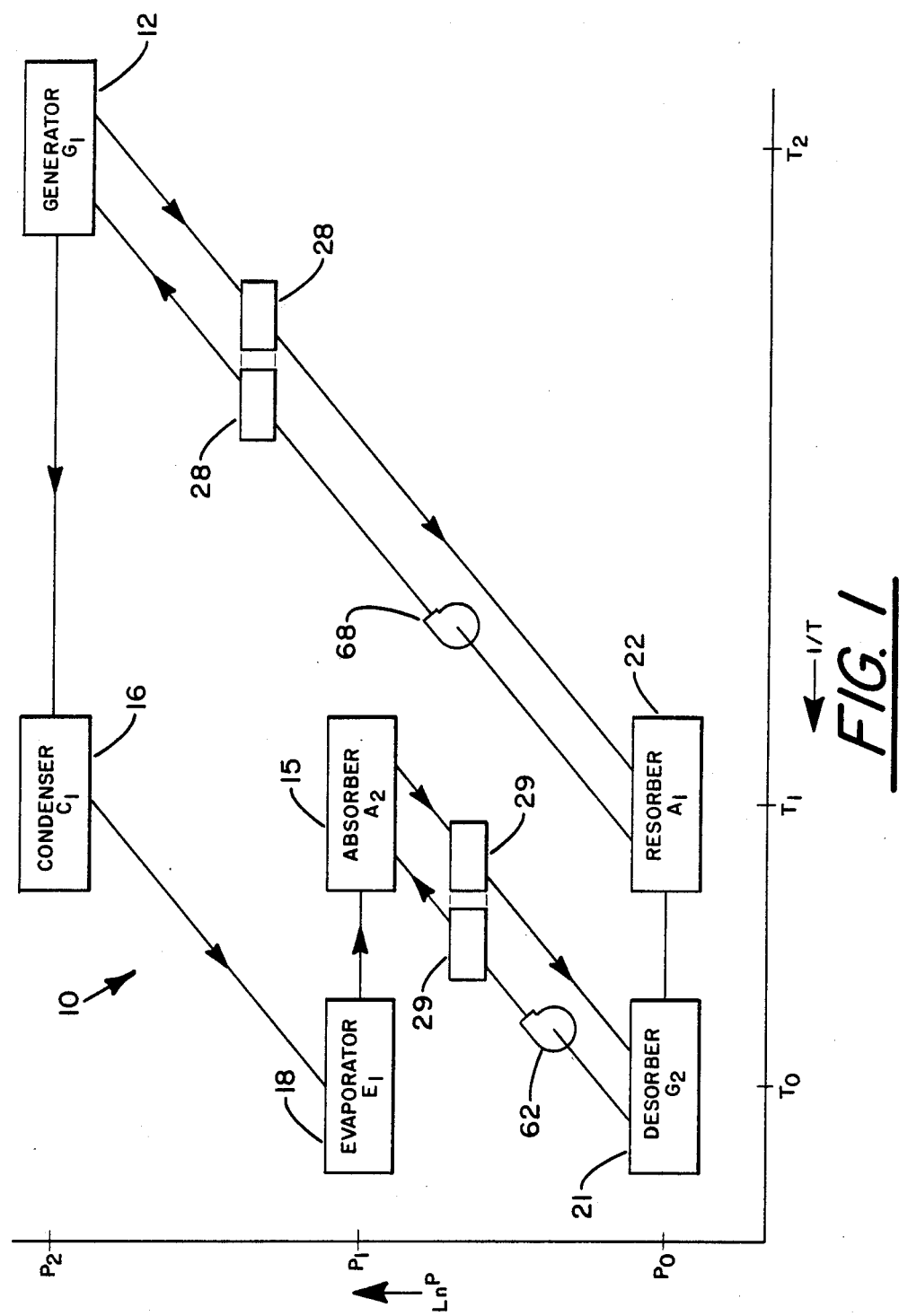
FIG. 1 is a schematic representation of a desorber-resorber absorption system of the present invention.

FIG. 1 illustrates a schematic representation of a double effect desorber-resorber absorption heat pump/refrigeration machine 10. The present machine comprises a high temperature generator 12, an intermediate temperature condenser 16, a low temperature evaporator 18, an intermediate temperature absorber 15, a low temperature desorber 21 and an intermediate temperature resorber 22. Further, the machine includes a high temperature heat exchanger 28, a low temperature heat exchanger 29 and respective solution pumps 68 and 62. The generator 12, resorber 22, heat exchanger 28, and solution pump 68 form a first solution loop, while absorber 15, desorber 21, heat exchanger 29, and solution pump 62 form a second solution loop. This schematic representation is shown within a coordinate system having increasing temperature from left to right along the abscissa and increasing pressure from bottom to top along the ordinate. Accordingly, the upper limit of the high temperature generator 12 is at a higher relative temperatures and pressure than the upper limit of the low temperature desorber 21.

Thus heat is recovered in the first solution loop from the strong absorbent leaving the high temperature generator 12 and entering the low temperature resorber 22 by heat exchanger 28, which is in heat exchange relationship with the weak solution leaving low temperature resorber 22 and entering the high temperature generator 12. Moreover, in the second solution loop solution leaving the desorber 21 and entering the intermediate temperature absorber 15 is in heat exchange relationship with the solution leaving intermediate temperature absorber 15 and entering the desorber 21 through heat exchanger 29.

Figure 2:
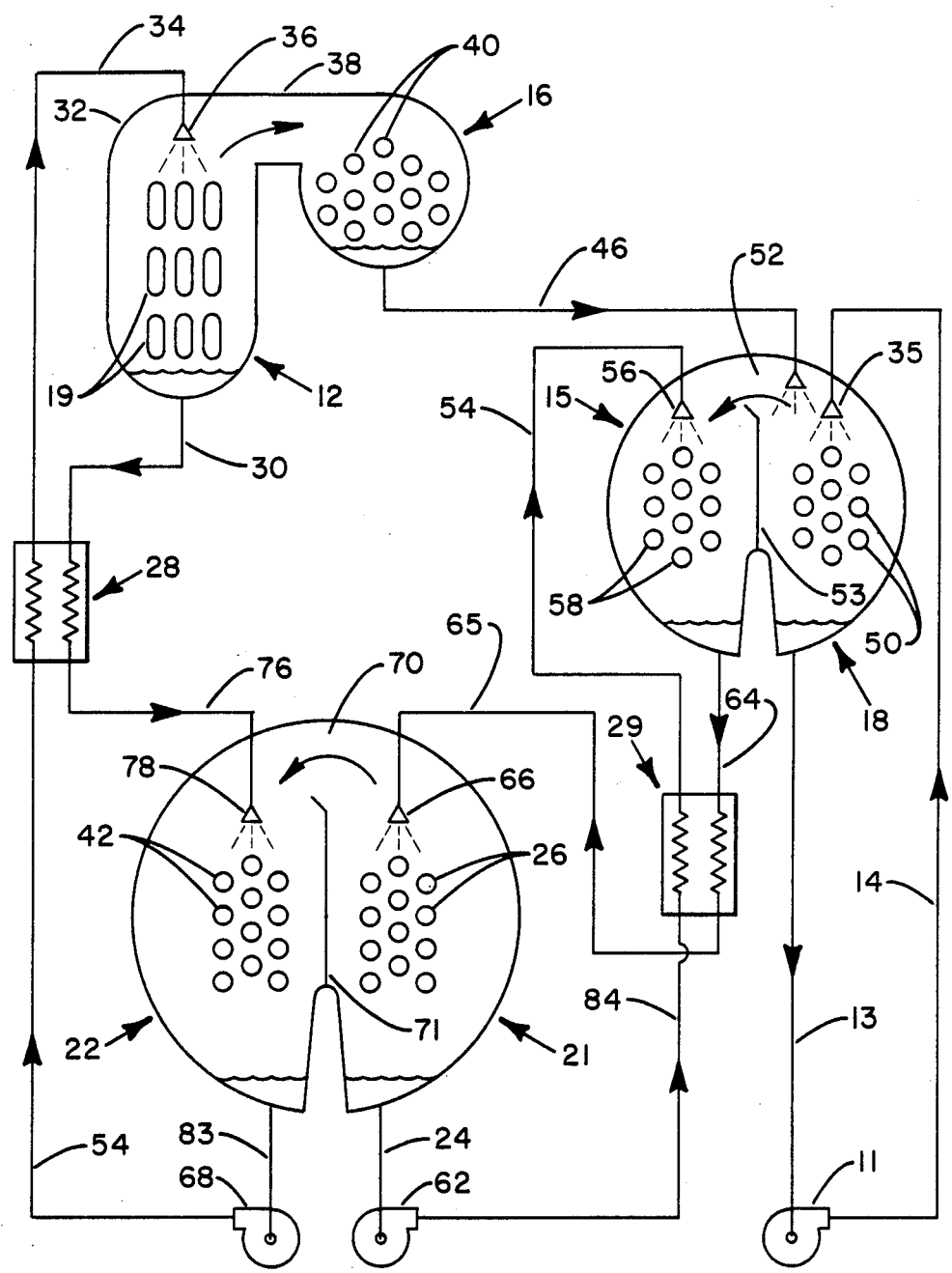
FIG. 2 is a diagrammatic view of a desorber-resorber absorption system of the present invention.

Referring now to FIG. 2, high temperature generator 12 is contained within a shell 32 and is heated by combustion gases from a burner (not shown) which flow through heat exchanger 19. A direct-fired submerged tube bundle heat exchanger could also be used to transfer heat to the generator. Heat is transferred from the combustion gases in the hat exchanger 19 to a weak absorbent solution being discharged from conduit 34 through spray header 36. The heat concentrates the weak solution by removing refrigerant therefrom. The vaporized refrigerant flows from the generator 12 through conduit 38 into condenser 16. The vaporized refrigerant flows over heat exchange tubes 40, having a coolant flowing therein, where it is condensed and collected in a low portion thereof. The condensed refrigerant is conveyed through conduit 46 and discharged through spray header 48 into evaporator 18. This condensed refrigerant is flash cooled by a working fluid, such as chilled water, flowing through tubes 50 within evaporator 18. The load on the chilled water determines the rate of vaporization of the condensed refrigerant, and the non-vaporized refrigerant is recirculated through conduits 13 and 14, and spray header 35 by recirculation pump 11.

Vaporized refrigerant within evaporator 18 flows through opening 51 in partition 53 which separates the evaporator 18 from the absorber 15 where it weakens the strong solution, also supplied to the intermediate temperature absorber 15 through spray header 56. The strong solution is pumped, by solution pump 62 through conduits 24, 84 and 54, heat exchanger 29, and through spray header 56. The combined strong solution and vaporized refrigerant flow across heat exchanger tubes 58 through which cooling fluid flows, and is condensed to form a weak solution. The condensed weak solution exits the absorber 15 by way of conduit means 64 through heat exchanger 29, conduit 65 and spray header 66 to low temperature desorber 21. The weak solution entering the desorber 21 is partially vaporized by heat transferred from heat exchange means 26 which is also coupled to the cooling load or chilled water. The remaining non-vaporized weak solution, which is now a strong solution, is pumped, as noted above, from the desorber 21 by low temperature solution pump 62 by way of conduit means 24, 84 and 54, through heat exchanger 29 and spray header 56 back to absorber 15.

The vaporized refrigerant from the desorber 21 flows through opening 70 in partition 71 to resorber 22, where it combines with the strong absorbent discharged from generator 12 through conduit means 30, heat exchanger 28, conduit means 76 and spray header 78. The vapor is absorbed by the strong solution on the heat exchanger tubes 42, and is then pumped through conduit means 83, 54 and 34, and heat exchanger 29, by solution pump 68 to be finally discharged from spray header 56, thus completing the fluid flow through the system.

The secondary system (not shown) for providing heat to or removing heat from a load generally includes indoor and outdoor coils, known in the art, which connect through the tubes 42, 26, 40, 50, and 58 in the absorption machine.

What is claimed is:

1. An improved absorption heat pump/refrigeration system comprising:

a generator means operating at a first temperature range for heating a first weak absorbent solution to generate a first vaporized refrigerant and a first strong absorbent solution;

a condenser means cooperating with said first generator means for condensing said first vaporized refrigerant;

an evaporator means for receiving said condensed refrigerant from said condenser means, said condensed refrigerant in heat exchange relationship with heat applied to said evaporator means for vaporizing said condensed refrigerant;

an absorber means for receiving the vaporized condensed refrigerant in combination with a second strong absorbent solution, said absorber means in heat exchange relationship with a cooling medium means whereby said second strong absorbent solution absorbs said vaporized condensed refrigerant resulting in a second weak absorbent solution;

a desorber means for receiving said second weak absorbent solution therein, said second weak absorbent solution in heat exchange relationship with a heating medium means which withdraws heat from a load whereby said second weak absorbent solution is partially vaporized resulting in said second strong absorbent solution and a second vaporized refrigerant;

means for circulating said second strong absorbent solution to said absorber means;

a resorber means for receiving and mixing said second vaporized refrigerant with said first strong absorbent solution of said first generator means, said mixed second vaporized refrigerant and said first strong absorbent solution in heat exchange relationship with a cooling medium whereby said first weak absorbent solution is formed; and means for circulating said first weak absorbent solution to said first generator means for use therein.

2. An improved absorption heat pump/refrigeration system as recited in claim 1 wherein said means for circulating said first weak absorbent solution includes a first circulation pump and a first heat exchanger having said first strong absorbent solution in heat exchange relationship with said first weak absorbent solution.

3. An improved absorption heat pump/refrigeration system as recited in claim 2 wherein said means for circulating said second strong absorbent solution include a second circulation pump and a second heat exchanger having said second strong absorbent solution in heat exchange relationship with said second weak absorbent solution.

* * * * *